Dec. 2, 1930.  O. BAMBERGER  1,783,555
TUBE TRANSPORTING DEVICE
Filed March 31, 1927
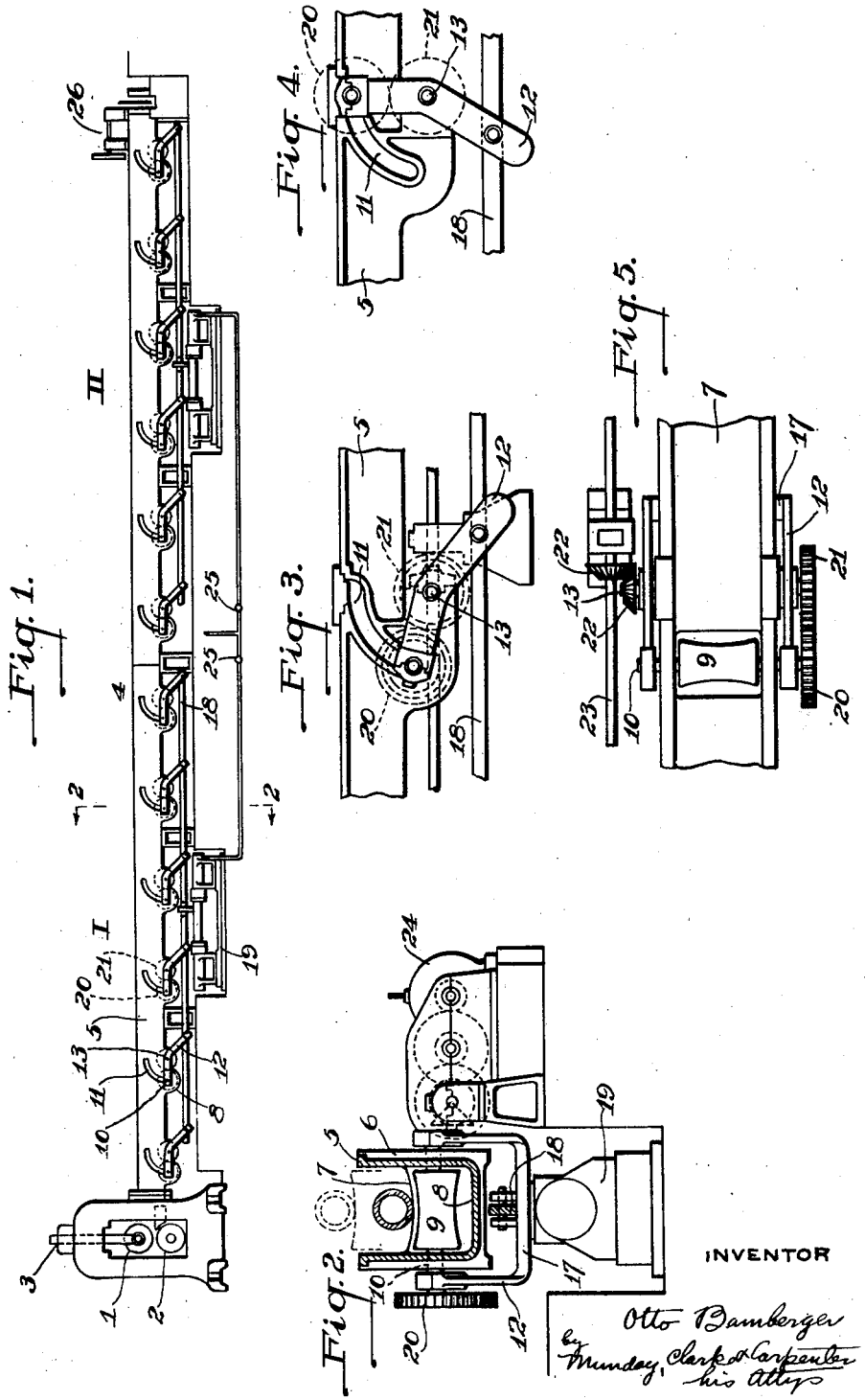
INVENTOR
Otto Bamberger
by Munday, Clark & Carpenter
his Attys Patented Dec. 2, 1930

1,783,555

UNITED STATES PATENT OFFICE

OTTO BAMBERGER, OF DUISBURG, GERMANY

TUBE-TRANSPORTING DEVICE

Application filed March 31, 1927. Serial No. 179,849.

This invention comprehends improvements in the art of transporting tubes and in its more specific aspects relates to a tube transporting device adapted to remove the completed tube from a pilgrim mill and to transport it to the sawing devices.

During the rolling and forging process in the pilgrim mill in which the tube is gradually stretched and continuously moved forward and backward and steadily revolved about its longitudinal axis the forward or finished end of the hot tube as it emerges from the mill must be protected from contact with anything that might damage its surface. The hot tube when finished has remaining on its rear end the so-called pilgrim head and in order to remove the tube from the mill the upper working roll of the mill is raised and the hot tube is lifted in order that its head may be cleared from the lower working roll and the stop. The hot tube must then be quickly conveyed from the mill to avoid interference with the following tube and in order that it may be speedily presented to the saw while still hot so as to avoid damage to the saw blades. Formerly when tube lengths of approximately 40 to 45 feet were rolled it was necessary to saw off only the two ends, but since at present tubes approximately 100 feet in length are being rolled in pilgrim mills it is necessary to saw off not only the ends of such tubes but also to saw the whole tube into sections, each of the desired length. The increased production of rolling mills has placed the highest demand upon saws and transporting devices in order to make it possible that the tubes be cut while still hot.

For the accomplishment of these results in the most efficient manner my invention contemplates the provision of a channel into which the tube as it is forged is gradually projected and a conveyor mechanism out of contact with the tube during the tube forming operation but movable, after this operation is completed and the upper roll of the pilgrim mill is lifted, to raise the pilgrim head of the tube over the lower roll, the conveyor mechanism then being operable to move the finished tube in a direction longitudinally of the tube while still in raised position to carry the pilgrim head free of the working rolls and to advance the forward end of the tube to a position adjacent the saw, the conveyor mechanism then being lowered to permit the forward end of the tube to be sawed off after which the conveyor mechanism carrying with it the tube is again raised and feeds the tube longitudinally in the same direction as before the desired distance and is then again lowered to permit a section of the proper length to be cut off. This operation is repeated as often as is necessary to subdivide the tube into the desired lengths and finally the end of the tube carrying the pilgrim head is removed. Where it is desired to sever only the ends of the original tube the tube would of course be moved through only one stage between cutting operations.

In order to increase the working capacity of the transporting device the conveyor mechanism is preferably subdivided into several sections, each capable of being simultaneously lifted with the others or independently lifted while others remain in their lowered position. This renders it possible to raise all of the conveyor sections to remove the finished tube from the mill and then as the tube is moved further and further from the mill and lowered in successive stages for sawing the conveyor sections between the mill and the advancing tube are kept in their lowered position in order not to interfere with the progress of the new tube being formed in the mill, only those sections of the transporting device lying under the remaining portion of the tube being raised to continue the tube on its journey. By reason of this arrangement there is no interruption to the continuous operation of the mill.

As a specific embodiment of my invention I have disclosed conveyor sections each composed of a series of rotatable rollers movable from a position out of contact with the tube to a position in which they engage the tube to lift and transport it longitudinally, U-shaped angle levers being provided between the legs of which the rollers are journaled, said levers having fulcrum shafts about which they are respectively freely rotatable, intermeshing gear wheels respectively fixed to one end of each roller shaft and to the corresponding end of its fulcrum shaft; common means for controllably rotating said fulcrum shafts; and means for simultaneously turning the levers of a given section or of a plurality or all of the sections about their shafts to raise or lower the rollers of the corresponding sections.

In addition to the general objects recited above the invention has for other objects such other improvements and advantages in construction and operation as are found to obtain in the structures and processes hereinafter described or claimed.

In the accompanying drawings forming a part of the specification and showing for purposes of exemplification a preferred form and manner in which the invention may be embodied and practiced, but without limiting the claimed invention specifically to such illustrative instance or instances:

Figure 1 is a side elevation showing my transporting system applied to a pilgrim mill, Fig. 2 is a section taken on the line 2—2 of Figure 1, Fig. 3 is an enlarged detail side elevation of a conveyor roller in lowered position and its associated mechanism, Fig. 4 is a similar view showing the roller in elevated position, and Fig. 5 is a fragmentary top plan view showing a roller and driving mechanism therefor.

The same characters of reference indicate the same parts throughout the several views.

Referring to the drawings there is diagrammatically shown a pilgrim mill 1 provided with forging rolls 2, the upper roll being provided with means shown conventionally at 3 for raising it above the lower roll to free the enlarged end or so-called pilgrim head remaining after the tube is completed.

The tube transporting device 4 for lifting the completed tube to free its pilgrim head from the lower roll 2 and for conveying it to the saw is shown as comprising a stationary tube guide channel 5 properly supported by suitable frames 6 and provided with a bottom 7 for supporting the tube as it emerges from the pilgrim mill and until it is finally finished.

Pockets 8 are provided in the bottom of the guide channel and normally located in these pockets are conveyor rollers 9 having rigid shafts 10 extending through arc-shaped slots 11 in the sides of the guide channel and journaled respectively at their opposite ends in levers 12 on opposite sides of the guide channel, said levers having fixed fulcrum points, being mounted for free rotation about the rotatable shafts 13 located respectively at the centers of curvature of the arc-shaped slots 11. The two levers constituting each roller supporting pair are rigidly connected at their lower ends by a member 17, which may conveniently be integral therewith, and which extends below the guide channel. For controlling the operation of the levers in unison there is shown by way of illustration a pull rod 18 pivotally connected to each of the members 17 and in turn connected to a power device 19 for moving the same to raise or lower the rollers. In order to effect a rotation of all of the rollers 9 there is rigidly mounted on one end of each of their shafts a gear wheel 20 meshing with a gear wheel 21 on the corresponding end of each of the rotatable shafts 13, these shafts being connected at their other ends by means of beveled gears 22 to a longitudinally extending shaft 23 controllably rotated by power means 24.

There are shown, by way of example, two groups or sections of conveyor rollers I and II capable of simultaneous or independent operation, controllable in any conventional manner as by means of a fluid controller diagrammatically shown at 25. There is provided at the end of the group remote from the mill a sawing device 26. It is obvious that the number of the groups between the mill and the saw may be varied at will. Also while the respective groups are shown as provided with the same number of equi-spaced rollers, one or more of the groups may be provided with a different number, as for instance the group adjacent the mill, which would permit the finished tube to be transported a shorter distance before its forward end is cut off than its travel between the remaining sections.

In the operation of my system the tube is gradually fed through the pilgrim mill, being continuously moved forward and backward while being uniformly rotated about its longitudinal axis, the finished end being supported upon the bottom 7 of the guide channel 5 until the whole tube is completed, whereupon the upper roll 2 of the mill is lifted and the power devices 19 are operated to raise all of the conveyor rollers 9 whereby the tube is uniformly lifted throughout its entire length to release its enlarged pilgrim head on its rear end from and raise it above the lower roll of the pilgrim mill. The rollers 9 are controllably rotated by the power device 24 to move the finished tube endwise toward the saw 26 and when the tube is sufficiently advanced the rollers are lowered allowing the tube to descend upon the bottom 7 of the channel, when the forward end may be sawed off. The rollers are then again lifted and the tube moved forward endwise a distance corresponding to the desired length of the first tube section when the rollers are again lowered and the section is sawed off, this operation being repeated as often as is necessary to divide the original tube into the desired sections and finally the last tube section is moved to the proper position for sawing off the pilgrim head on its rear end. In order that there may be no interference with the feeding of a new tube from the pilgrim mill, after the first cut of the finished tube is made only the conveyor section or sections corresponding to the length of the tube remaining in the channel is raised, the conveyor section or sections adjacent the mill being maintained in lowered position. It is obvious that if desired the saw 26 may be so located as to cut off the front end of the finished tube before the tube leaves the pilgrim mill, in which case the upper pilgrim roll 2 would be lifted and the rear end of the tube would be slightly raised to release it from contact with the lower continuously rotating pilgrim roll 2. The forward movement of the tube during the first stage will then correspond to the length of the first tube section desired.

The invention as hereinabove set forth is embodied in a particular form of construction but may be variously embodied within the scope of the claims hereinafter claimed.

I claim:

1. In a tube-mill transporting apparatus, in combination: conveying means for conveying tubes from the tube-forming mill at one end of said conveying means to a tube-cutting machine at the other end of said conveying means; and a framework for said conveying means; said conveying means being of a length substantially that of the distance between said tube-forming mill and said tube-cutting machine and also substantially the length of the longest tube adapted to be formed by said mill; and said conveying means being constituted of a plurality of end-to-end sections whereof one end-section extends directly from the tube-forming mill and the other end-section extends directly to said tube-cutting machine, said end-sections being respectively provided with power-means for raising and lowering them either simultaneously or successively and in such sequence that a formed tube may be lifted and advanced by both said sections, and then further advanced by the farther end-section before said tube-cutting machine while the other end-section lowers to make way for a second tube issuing from the tube-forming mill, and so that said farther end-section may be lowered just as it discharges the first tube before said tube-cutting machine and in time to make way for the advancing end of the said second tube that is passing over the said other previously lowered end-section of the conveying means, whereby the over-all length of the conveying means between the tube-forming mill and said tube-cutting machine may be substantially the length of the longest tube to be formed and cut, and yet substantially continuous operation of the tube-forming mill need not be interrupted by the operation of said tube-cutting machine to cut said first tube into shorter lengths.

2. In a tube-mill transporting apparatus, in combination: conveying means for conveying tubes from the tube-forming mill to a tube-cutting machine; and a stationary support for supporting both the tube issuing from said tube-forming mill at one end of said support and the tube presented to the tube-cutting machine at the other end of said support; said conveying means and said support being substantially coextensive, and of a length substantially that of the distance between said tube-forming mill and said tube-cutting machine and also substantially the length of the longest tube adapted to be formed by said mill; and said conveying means being constituted of a plurality of end-to-end sections whereof one end-section extends directly from the tube-forming mill and the other end-section extends directly to said tube-cutting machine, said end-sections being respectively provided with power-means for raising and lowering them either simultaneously or successively and in such sequence that a formed tube may be lifted and advanced by both said sections, and then further advanced by the farther end-section before said tube-cutting machine while the other end-section is lowered to allow the aforesaid support to receive a second tube issuing from the tube-forming mill, and so that said farther end-section may be lowered just as it discharges the first tube before said tube-cutting machine and in time to allow the farther end of the aforesaid support to receive the advancing end of the said second tube that is passing over the said other previously lowered end-section of the conveying means; whereby the over-all length of the conveying means and stationary support between the tube-forming mill and said tube-cutting machine may be substantially the length of the longest tube to be formed and cut, and yet substantially continuous operation of the tube-forming mill need not be interrupted by the operation of said tube-cutting machine to cut said first tube into shorter lengths.

3. In a tube-mill transporting apparatus, in combination: conveying means for conveying tubes from the tube-forming mill to a tube-cutting machine; and a stationary support for supporting both the tube issuing from said tube-forming mill at one end of said support and the tube presented to said tube-cutting machine at the other end of said support; said conveying means being substantially co-extensive with said support and constituted of a plurality of end-to-end sections provided with power-means for raising and lowering them either in unison or severally and in such sequence that they are adapted to convey in close succession tubes whose length greatly exceeds that of any of said sections, and so that substantially continuous operation of the tube-forming mill need not be interrupted by the operation of said tube-cutting machine.

4. In a tube-mill transporting apparatus, in combination: conveying means for conveying tubes from the tube-forming mill at one end of said conveying means to a tube-cutting machine at the other end of said conveying means; and a framework for said conveying means; said conveying means being constituted of a plurality of end-to-end sections provided with power-means for raising and lowering them both in unison and severally and in such sequence that they are adapted to convey in close succession tubes whose length greatly exceeds that of any of said sections, and so that substantially continuous operation of the tube-forming mill need not be interrupted by the operation of said tube-cutting machine.

5. The combination as set forth in claim 3, in which the conveying means when lifted serves also to free the tubes from the mill.

6. The combination as defined in claim 3, in which means are provided for imparting a tube feeding movement to said conveyor sections simultaneously.

7. The combination as defined in claim 3, in which means are provided for imparting a tube feeding movement to said conveyor sections continuously when in lowered, intermediate and in raised positions.

8. The combination as defined in claim 3, in which a saw is provided at the end of the sections remote from the mill to constitute the said tube-cutting machine.

9. In a tube-mill transporting apparatus the combination with a tube-forming mill adapted for forming tubes therein and a saw adapted for cutting tubes from said mill of a conveyor means comprising groups of rolls adapted to be raised and lowered simultaneously as a whole and also separately and independently of each other group and adapted for feeding tubes from said mill to said saw and to accommodate a tube newly forming in the mill while another of the groups of rolls is presenting a previously finished tube to the saw.

In testimony whereof, I have hereunto set my hand.

OTTO BAMBERGER.